(12) United States Patent
Conner et al.

(10) Patent No.: US 9,643,646 B2
(45) Date of Patent: *May 9, 2017

(54) STEERING KNUCKLE APPARATUS FOR A VEHICLE

(71) Applicants: Hitachi Metals America, Ltd., Novi, MI (US); Hitachi Metals, Ltd., Tokyo (JP)

(72) Inventors: Aaron Conner, Novi, MI (US); Rick Bowen, Novi, MI (US); Ronald Walker, Novi, MI (US); Satoru Shiozawa, Moka (JP)

(73) Assignees: HITACHI METALS AMERICA, LTD., Novi, MI (US); HITACHI METALS, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,564

(22) Filed: Nov. 4, 2014

(65) Prior Publication Data

US 2016/0090121 A1  Mar. 31, 2016

Related U.S. Application Data

(63) Continuation-in-part of application No. 29/503,919, filed on Sep. 30, 2014, now abandoned, and a
(Continued)

(51) Int. Cl.
*B62D 7/18* (2006.01)

(52) U.S. Cl.
CPC ............ *B62D 7/18* (2013.01); *B60G 2206/50* (2013.01)

(58) Field of Classification Search
CPC  B62D 7/18; B60G 2206/50; B60G 2204/148; B60K 17/303; B60K 17/306
(Continued)

(56) References Cited

U.S. PATENT DOCUMENTS

| 3,749,415 A | 7/1973 | Sampatacos |
| 4,618,159 A | 10/1986 | Kozyra et al. |

(Continued)

FOREIGN PATENT DOCUMENTS

| CN | 302660191 S | * 11/2013 |
| IN | 2012MU00844 | 3/2013 |

(Continued)

OTHER PUBLICATIONS

International Search Report in PCT/US2015/059017 dated Jan. 13, 2016.
(Continued)

*Primary Examiner* — Keith Frisby
(74) *Attorney, Agent, or Firm* — McGinn IP Law Group, PLLC

(57) ABSTRACT

A vehicle steering knuckle includes a body part to which an axle is attached, an arm portion including one end integrally connected with an outer periphery of the body part and spreading outwardly from the body part along an extending axis, and a connecting portion configured to be connected with a vehicle component. The arm portion includes a first portion, a second portion, and a hollow portion. The first portion including a peripheral wall configured to enclose around the extending axis. The second portion including a peripheral wall including an opening partially opened around the extending axis. At a cross-section intersecting the extending axis, an end portion of the peripheral wall of the second portion on a side of the opening includes an enlarged portion which is enlarged in width as compared with side portions adjacent to the end portion.

18 Claims, 8 Drawing Sheets

Related U.S. Application Data continuation-in-part of application No. 29/503,927, filed on Sep. 30, 2014, now Pat. No. Des. 755,687, and a continuation-in-part of application No. 29/503,929, filed on Sep. 30, 2014, now abandoned, and a continuation-in-part of application No. 29/503,930, filed on Sep. 30, 2014, now Pat. No. Des. 764,360, and a continuation-in-part of application No. 29/503,931, filed on Sep. 30, 2014, now abandoned, and a continuation-in-part of application No. 29/503,922, filed on Sep. 30, 2014, now Pat. No. Des. 764,359.

(58) Field of Classification Search
USPC .................................................. 280/93.512
See application file for complete search history.

(56) References Cited

U.S. PATENT DOCUMENTS

| | | | |
|---|---|---|---|
| 4,722,540 A | | 2/1988 | Kozyra et al. |
| 5,022,673 A | * | 6/1991 | Sekino ............... B60G 3/20 |
| | | | 280/124.138 |
| 5,120,150 A | | 6/1992 | Kozyra et al. |
| 5,366,233 A | | 11/1994 | Kozyra et al. |
| 6,179,308 B1 | | 1/2001 | Mielauskas et al. |
| 6,739,422 B2 | * | 5/2004 | Krude ................. B60B 27/00 |
| | | | 180/256 |
| D612,304 S | * | 3/2010 | Mahnig ................ D12/160 |
| 8,297,632 B2 | * | 10/2012 | Webster ............. B22D 18/04 |
| | | | 280/93.512 |
| D686,952 S | * | 7/2013 | Rau ..................... D12/160 |
| 8,794,647 B2 | * | 8/2014 | Moessinger ......... B60G 7/008 |
| | | | 280/124.138 |
| 2006/0110213 A1 | | 5/2006 | Wolf |
| 2013/0181421 A1 | * | 7/2013 | Rohde ................. B62D 7/18 |
| | | | 280/93.512 |
| 2015/0251695 A1 | | 9/2015 | Burgess et al. |

FOREIGN PATENT DOCUMENTS

| | | | |
|---|---|---|---|
| JP | 2001-114127 A | * | 4/2001 |
| JP | 2001-187583 A | | 7/2001 |
| JP | 1358555 S | * | 5/2009 |
| JP | 1447400 S | * | 7/2012 |
| JP | 2014-91469 A | * | 5/2014 |
| WO | WO 97/13674 | | 4/1997 |

OTHER PUBLICATIONS

Written Opinion of the International Searching Authority in PCT/US2015/059017.

United States Notice of Allowance dated Dec. 28, 2015 in co-pending U.S. Appl. No. 29/503,927.

United States Office Action dated Feb. 12, 2016 in co-pending U.S. Appl. No. 14/867,367.

United States Office Action dated Dec. 21, 2015 in co-pending U.S. Appl. No. 29/503,930.

United States Office Action dated Dec. 21, 2015 in co-pending U.S. Appl. No. 29/503,922.

* cited by examiner

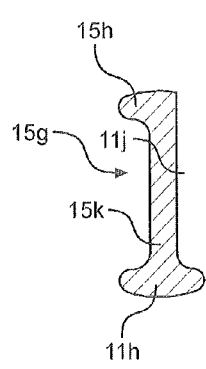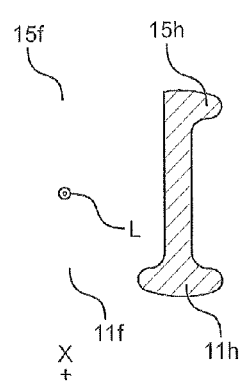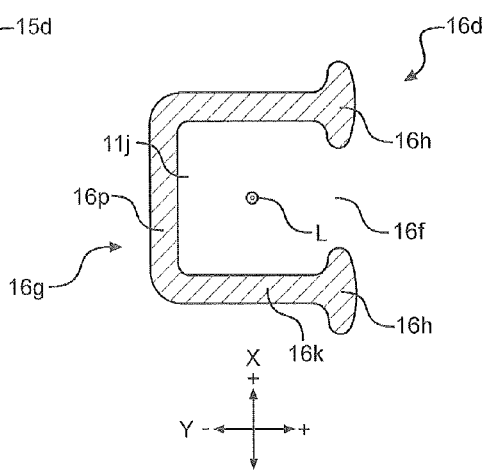
FIG. 7E  FIG. 7F
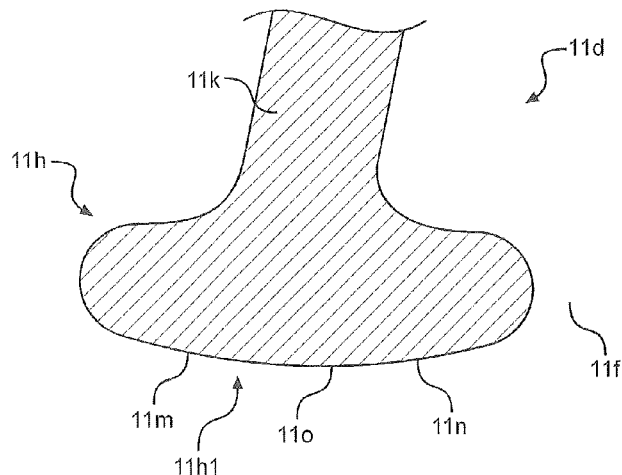
FIG. 8

STEERING KNUCKLE APPARATUS FOR A VEHICLE

This is a continuation in part of U.S. Design application Ser. Nos. 29/503,919, 29/503,922, 29/503,927, 29/503,929, 29/503,930, and 29/503,931, all of which are entitled "Steering Knuckle for a Driving Apparatus", filed Sep. 30, 2014, and assigned to the assignee of the present invention.

BACKGROUND OF THE INVENTION

Field of the Invention

The invention relates to a steering knuckle for a vehicle including a body part, a hollow part, an arm portion, and a connecting portion.

Description of the Related Art

In a conventional steering knuckle apparatus including a body part, a hollow part, an arm portion, and a connecting portion, a thickness of the material surrounding the hollow part is increased or a size of the hollow portion is decreased to increase rigidity of the steering knuckle (e.g., see JP-A 2001-187583 and JP-A 2001-114127).

In a steering knuckle described in JP-A 2001-187583, at least two hollow parts formed in arms communicate with each other in a cylindrical part, and/or the hollow parts at least partially pass through the cylindrical part and communicate with an axial hole. Further, a direction of a hollow part opening, a shape in a vicinity of the hollow part opening, a wall thickness of the cylindrical part, and a wall thickness of a hollow part arm outer surface, are appropriately selected.

In a steering knuckle described in JP-A 2001-114127, a strut mounting arm projecting upward from a knuckle body is connected to an end of a strut, and a lower arm mounting arm projecting downward from the knuckle body is connected to a top of a lower arm through a king pin together. A hollow part is provided to open in an extending direction of the strut mounting arm on the middle in a longitudinal direction of a surface of the strut mounting arm on an outer side of an automobile body.

SUMMARY OF THE INVENTION

However, in the above first-described steering knuckle having such a structure, the steering knuckle has a relatively large wall thickness of the cylindrical part and a relatively large wall thickness of a hollow part outer arm. Moreover, the hollow portion ratio is relatively small. The combination of the large thickness and the small hollow portion ratio significantly increases the weight of the steering knuckle.

However, in the above second-described steering knuckle having such a structure, rigidity of the steering knuckle is obtained by increasing the thickness to both sides along the hollow part which hinders downsizing/weight reduction of the steering knuckle.

Accordingly, it is an exemplary feature of the invention to provide a vehicle steering knuckle with an improved weight reduction in which the deformation and the damage of an arm portion are suppressed as compared to the conventional steering knuckles.

According to one exemplary embodiment of the invention, a steering knuckle apparatus includes:

a body part to which an axle is attached;

an arm portion including one end integrally connected with an outer periphery of the body part and spreading outwardly from the body part along an extending axis; and a connecting portion integrally connected with another end of the arm portion, the connecting portion being configured to be connected with a vehicle component, wherein the arm portion includes:

a first portion integrally connected with the connecting portion in a direction along the extending axis;

a second portion interposed between the first portion and the body part; and a hollow portion configured to communicate with the first portion and the second portion, wherein the first portion includes a peripheral wall configured to enclose around the extending axis, wherein the second portion includes a peripheral wall including an opening partially opened around the extending axis, wherein, at a cross-section intersecting the extending axis, an end portion of the peripheral wall of the second portion on a side of an opening comprises an enlarged portion which is enlarged in width as compared with another portion adjacent to the end portion.

In a second exemplary embodiment, a steering knuckle for a vehicle including an axle, the steering knuckle includes:

a body part to which the axle is attached;

an arm portion including one end integrally connected with an outer periphery of the body part and spreading outwardly from the body part along an extending axis; and a connecting portion integrally connected with another end of the arm portion, the connecting portion being configured to be connected with a vehicle component, wherein the arm portion includes:

an opening having the extending axis therethrough; and an end portion configured to surround the opening, a width of the end portion being defined from an edge of the opening to a distal edge of the end portion in a vehicle width direction, wherein a first width at a center of the end portion is less than a second width measured nearer to the connecting portion of the end portion, and wherein the first width at the center of the end portion is less than a third width measured nearer to the body part of the end portion.

In a third exemplary embodiment, a steering knuckle for a vehicle including an axle, the steering knuckle includes:

a body part to which the axle is attached;

an arm portion including one end integrally connected with an outer periphery of the body part and spreading outwardly from the body part along an extending axis; and a connecting portion integrally connected with another end of the arm portion, the connecting portion being configured to be connected with a vehicle component, wherein the arm portion includes:

a portion interposed between the connecting portion and the body part;

an opening having the extending axis therethrough;

a hollow portion configured to communicate with the opening and the portion, wherein the portion includes a peripheral wall having a first thickness, and wherein, at a cross-section intersecting the extending axis, an end portion of the peripheral wall of the portion on a side of the opening comprises an enlarged portion which has a second thickness, the second thickness being greater than the first thickness.

In the above exemplary embodiments of the steering knuckle, various modifications can be made including the following modifications and changes, either singly or in combination.
  (i) The enlarged portion can be located to intersect a direction of a force acting on the arm portion via the connecting portion.
  (ii) At the cross-section intersecting the extending axis, the enlarged portion can be provided at both sides of the opening.
  (iii) In the direction along the extending axis, the enlarged portion can be extending toward the first portion and integrated with the peripheral wall of the first portion.
  (iv) in the direction along the extending axis, the enlarged portion can be extending toward the body part and integrated with the body part.
  (v) a width of the enlarged portion can be increased from a center of the second portion toward the first portion or the body part along the extending axis.
  (vi) an outer surface of the enlarged portion may include two or more surfaces formed along the extending axis.
  (vii) at the cross-section intersecting the extending axis, the enlarged portion may intersect side portions of the peripheral wall to have a substantially T-shape.

Effects of the Invention

According to one exemplary embodiment of the invention, a technical problem of the conventional steering knuckles can be solved by providing an enlarged portion on a side of an opening. The weight reduction degree can be achieved by increasing a volume of a hollow portion and an area of an opening.

More specifically, weight reduction of a steering knuckle can be achieved by providing a hollow portion configured to communicate with a first portion and a second portion, and providing an opening at a peripheral wall surrounding the second portion. Moreover, rigidity of the arm portion can be improved by integrally (i.e., having a unitary construction as one piece) connecting a first portion to a connecting portion which is a point of action where a load acts on the arm portion, and providing the first portion with a closed structure comprising a peripheral wall enclosing a space around an extending axis, thereby suppressing the deformation of the arm portion when the load acts on the arm portion.

Additionally, a stress occurring on a surface of an end portion formed on an opening-side of the peripheral wall of the second portion can be relaxed by providing the end portion as an enlarged portion, thereby enhancing the strength of the second portion.

BRIEF DESCRIPTION OF THE DRAWINGS

Next, the present invention will be explained in more detail in conjunction with the attached exemplary drawings, wherein:

FIG. 7A to FIG. 7F are various cross-sectional views of the steering knuckle in FIG. 3;

FIG. 8 is an enlarged view of part D of FIG. 7A.

DETAILED DESCRIPTION OF THE EXEMPLARY EMBODIMENTS

Figure 1:
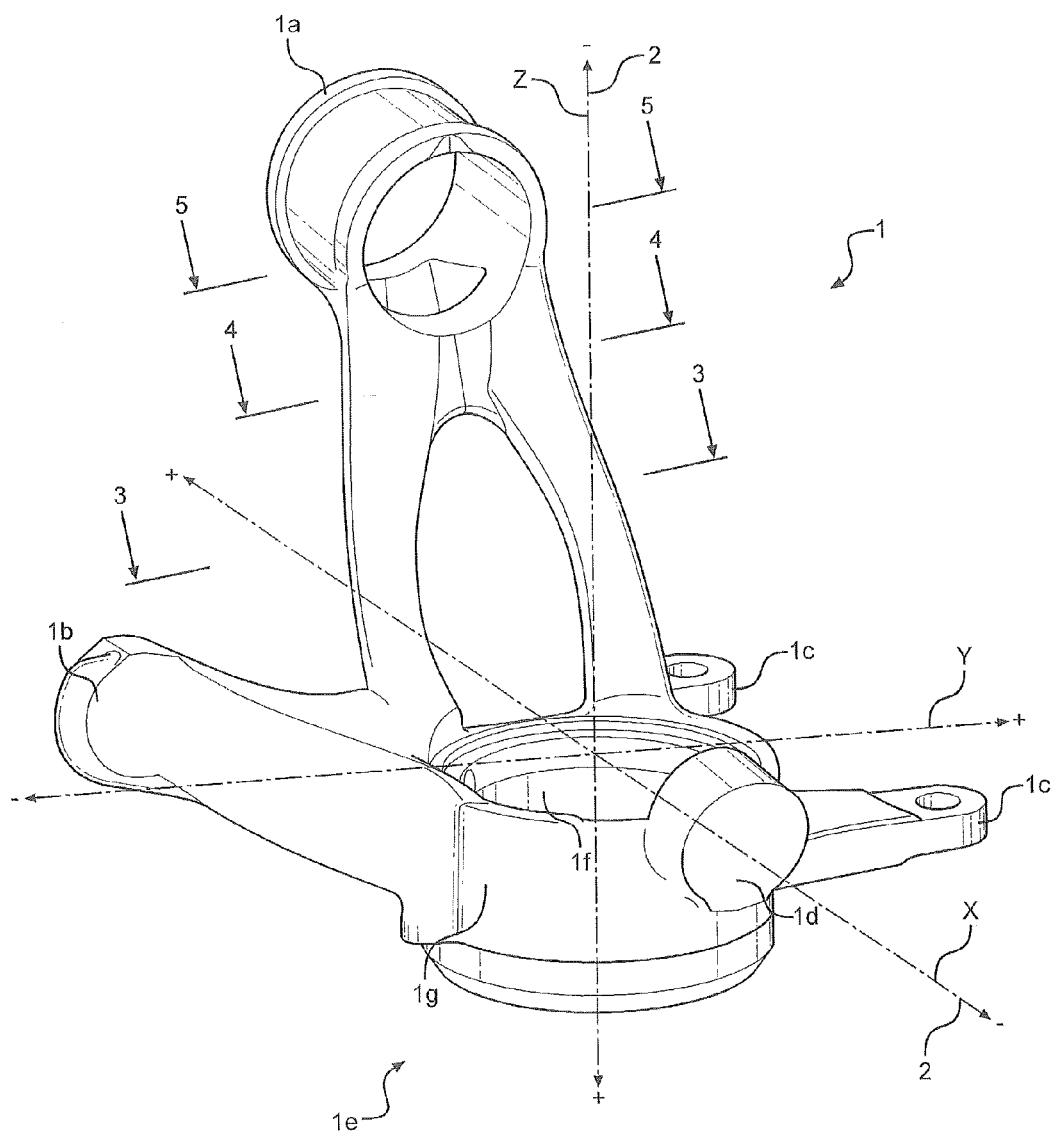
FIG. 1 is a perspective view showing a steering knuckle apparatus in a first embodiment of the present invention.
Figure 2:
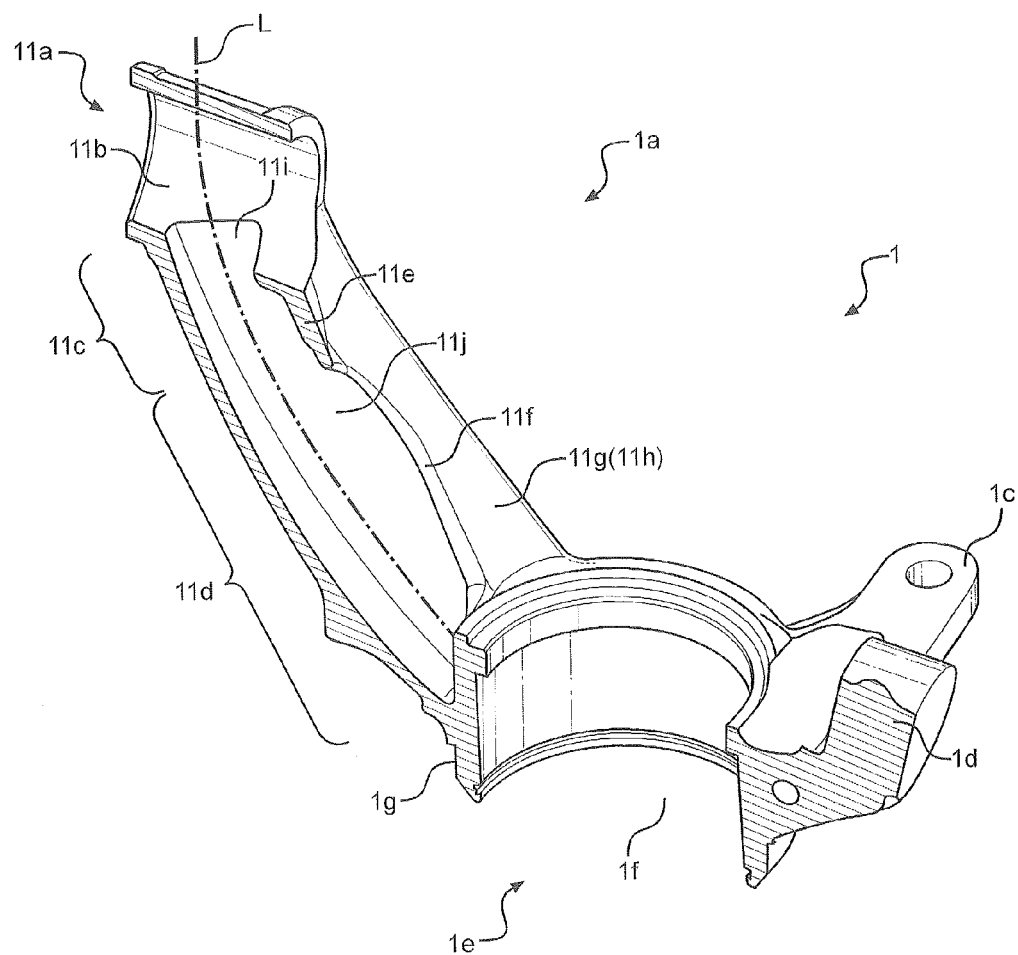
FIG. 2 is a cross-sectional view taken along a 2-2 plane in FIG. 1.

FIG. 1 is a perspective view showing a steering knuckle apparatus in a first exemplary embodiment of the invention. FIG. 2 is a cross-sectional view taken along a 2-2 plane in FIG. 1.

As shown in FIG. 1 and FIG. 2, the steering knuckle 1 is formed in one-piece (i.e., integrally having a unitary construction) and is provided with an arm portion (e.g., strut arm) 1a, a tie rod arm 1b, lower control arm-attaching arms 1d, a body part 1e, and a connecting portion 11a. A material of the steering knuckle 1 may be cast iron, aluminum, steel, or any similar material. The material of the steering knuckle is generally known to those skilled in the art and will not be described in greater detail.

The arm portion 1a includes one end integrally connected with an outer periphery 1g of the body part 1e and spreading outwardly from the body part 1e along an extending axis L (see FIG. 2). The connecting portion 11a is integrally connected with another end of the arm portion 1a. The connecting portion 11a is configured to be connected with a vehicle component (i.e., a strut). The body part 1e includes a brake arm 1c and an axle attaching hole if.

As shown in FIG. 2, the arm portion 1a is provided with a strut attaching hole 11b, a first portion 11c integrally connected with the connection portion 11a in a direction along the extending axis L, a second portion 11d which is provided between the first portion 11c and the body part 1e, an upper opening aperture 11i disposed on an inner surface of the connection portion 11a nearest the first portion 11c, and a hollow portion 11j which communicates with the first portion 11c and the second portion 11d. The first portion 11c has a peripheral wall 11e which encloses the extending axis L. The second portion 11d has a peripheral wall 11g including an opening 11f which is partially opened around the extending axis L. The opening 11f may have an oval shape but may have other exemplary shapes such as an omega-like shape.

Figure 3:
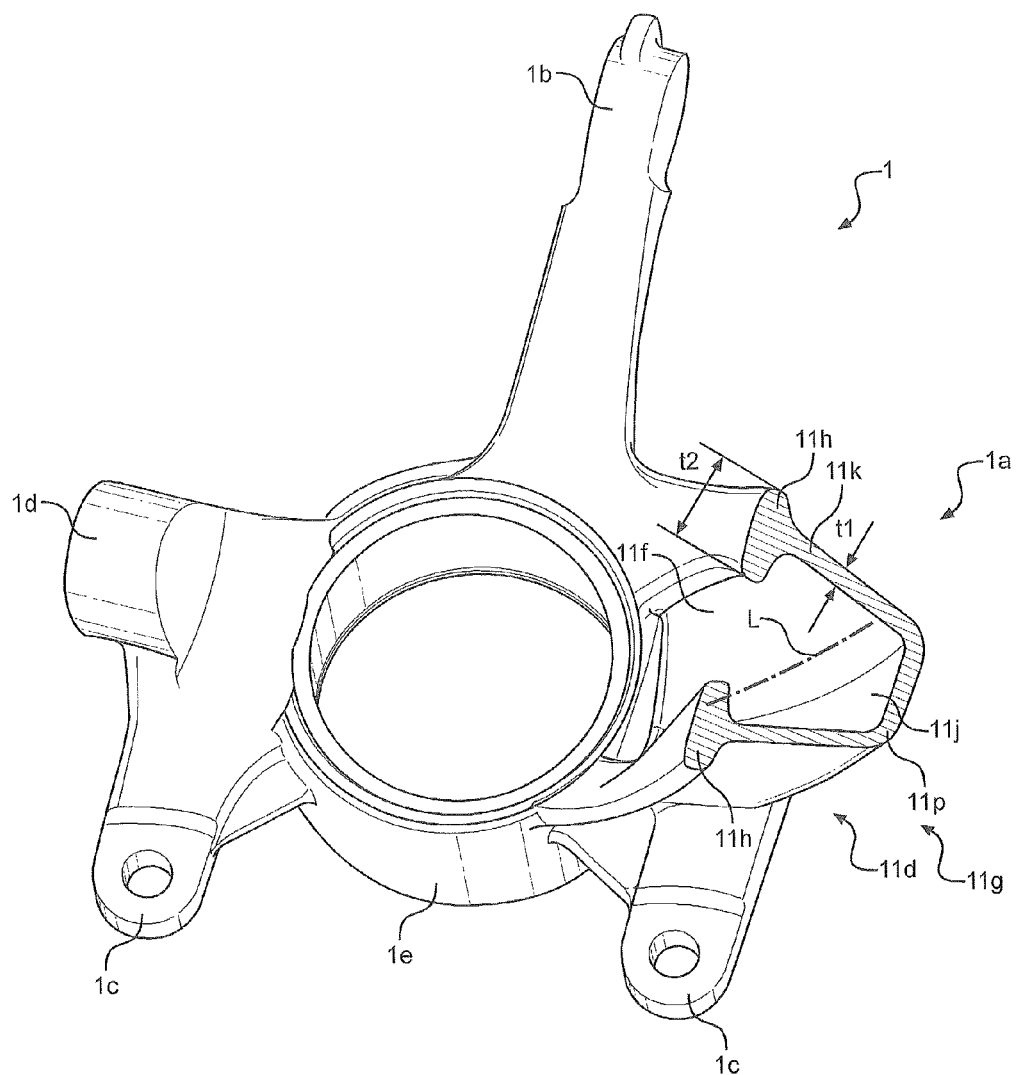
FIG. 3 is a view on arrow 3-3 in FIG. 1.

FIG. 3 shows a cross-section intersecting the extending axis L on arrow 3-3 of FIG. 1. An end portion 11h of the peripheral wall 11g of the second portion 11d on a side of the opening 11f has an enlarged portion (11h, having thickness t2) which is enlarged in its width relative to side portions (11k, having thickness t1) of the peripheral wall 11g adjacent to the end portion 11h. A thickness t2 (i.e., second thickness) of the enlarged portion 11h is greater than a thickness t1 (i.e., first thickness) of the other portion 11k. The thickness t2 may be between 2.75 and 6.75 times greater than the thickness t1. More preferably, the thickness t2 may be between 4.2 and 6.75, 3.0 and 5.6, or 2.75 and 4.6 times greater than the thickness t1. Most preferably, the thickness t2 may be 5.3, 5.5, or 4.5 times greater than the thickness t1.

Further, the enlarged portion 11h is provided at both sides of the opening 11f at the cross-section intersecting the extending axis L. The enlarged portion 11h extends in a direction along the extending axis L toward the body part 1e. The enlarged portion 11h is formed integrally with the body part 1e.

Figure 4:
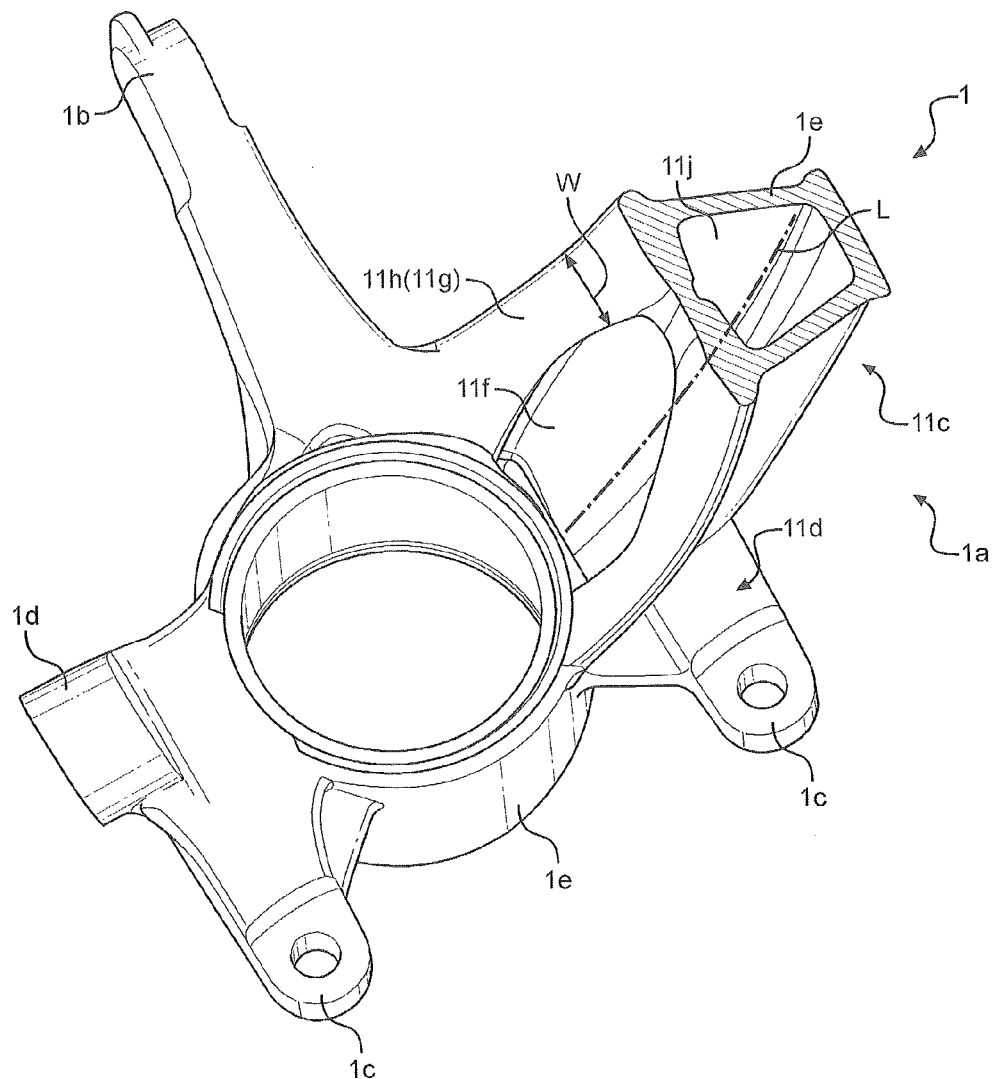
FIG. 4 is a view on arrow 4-4 in FIG. 1.

Turning to FIG. 4, FIG. 4 shows a cross-section intersection of the extending axis L on arrow 4-4 of FIG. 1. The enlarged portion 11h extends in a direction along the extending axis L toward the first portion 11c. The enlarged portion 11h is integrally formed with the peripheral wall 11e of the first portion 11c.

Figure 5:
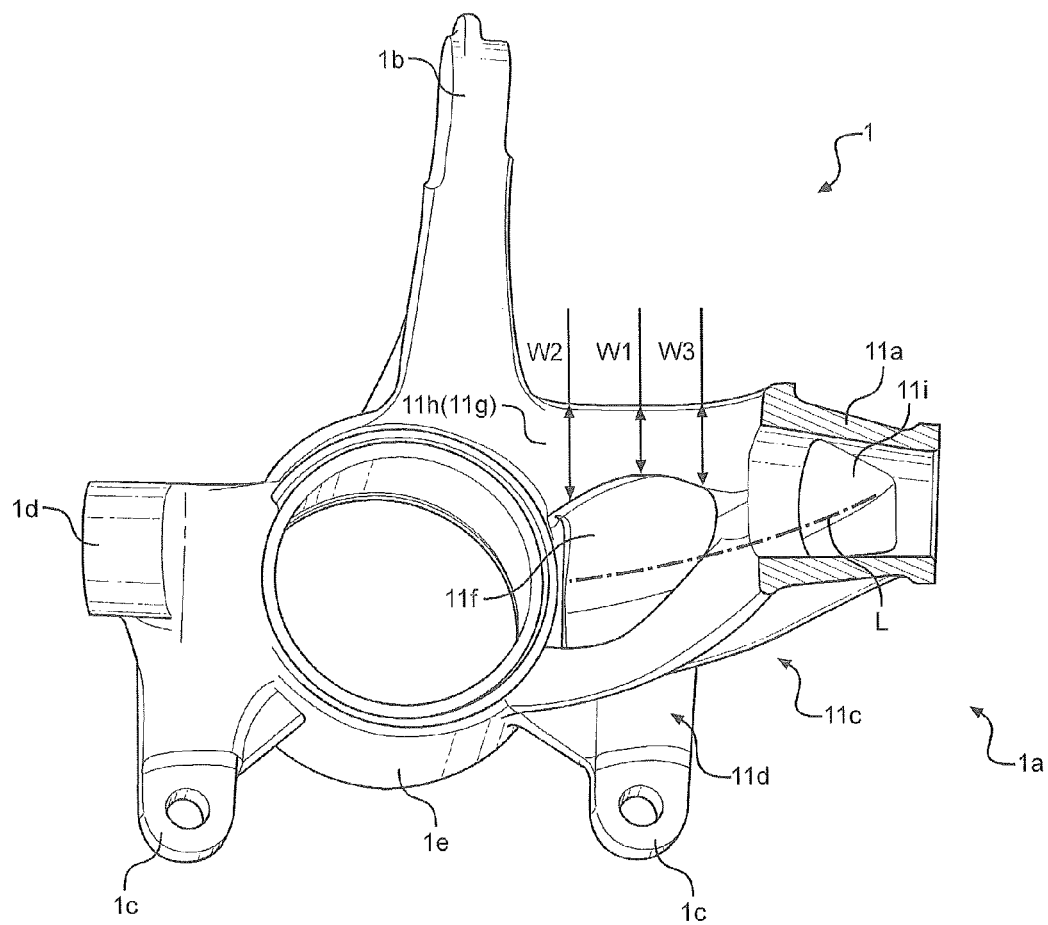
FIG. 5 is a view on arrow 5-5 in FIG. 1.

FIG. 5 shows a cross-section intersection of the extending axis L on arrow 5-5 of FIG. 1. As seen in FIG. 5, the oval (e.g., omega-like) cross-section of the opening 11f varies a width W of the enlarged portion 11h at various points along the extending axis L. The width W of the enlarged portion 11h increases from a center of the second portion 11d toward the first portion 11c along the extending axis L. The width W of the enlarged portion 11h increases from the center of the second portion 11d toward the body part 1e along the extending axis L.

According to the above exemplary embodiment of the steering knuckle apparatus, as seen in FIG. 5, a first width W1 of the enlarged portion 11h is measured where an edge of the opening 11f is nearest a distal edge of the enlarged portion 11h. The first width W1 is substantially at the center of the second portion 11d. A second width W2 of the enlarged portion 11h is located between the center of the second portion 11d and the body part 1e. The second width W2 preferably is greater than the first width W1. More preferably, the second width W2 may be between 1.3 and 2.2 times greater than the first width W1. Even more preferably, the second width W2 may be between 1.3 and 1.7 or 1.65 and 2.2 times greater than the first width W1. Most preferably, the second width W2 may be 1.35, 1.65, or 2.15 times greater than first width W1.

Also seen in FIG. 5, a third width W3 of the enlarged portion 11h is located between the center of the second portion 11d and the first portion 11c. The third width W3 is greater than the first width W1. More preferably, the third width W3 may be between 1.15 and 1.55 times greater than the first width W1. Even more preferably, the third width W3 may be between 1.2 and 1.51 times greater than the first width W1. Most preferably, the third width W3 may be 1.22 or 1.5 times greater than first width W1.

Figure 6:
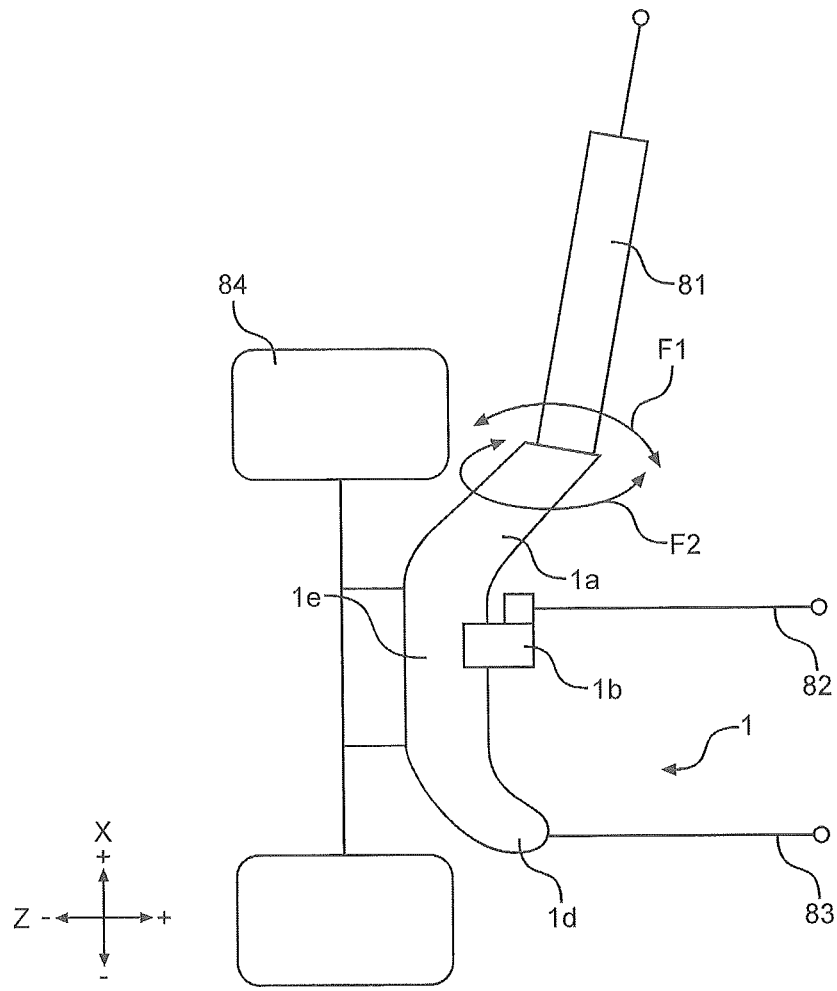
FIG. 6 is a schematic plan diagram of a suspension device to which the present invention may be applied.

Referring to FIG. 6, the vehicle steering knuckle 1 may be attached to a suspension device of a motor vehicle including a strut 81, a tie rod 82, and a lower control arm 83, and is positioned adjacent a tire 84 of the motor vehicle. The enlarged portion (11h, t2) is located to intersect a direction of a force F1 acting on the arm portion 1a via the connection portion 11a. A height direction of a vehicle body is defined as (+) being upward and (−) being downward. A longitudinal direction of the vehicle body is defined as (+) being forward and (−) being backward.

Next, a shape of the cross-section of FIG. 3 will be described in reference to FIG. 7A and FIG. 8.

Figure 7A:
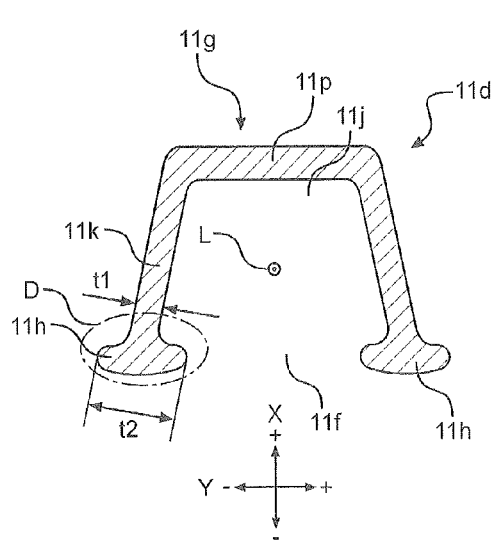

As shown in FIG. 7A, the cross-section has a substantially modified U-shape surrounding the hollow portion 11j which is formed by the peripheral wall 11g of the second portion 11d. The peripheral wall 11g includes the enlarged portion 11h, a pair of side portion 11k, and a back portion 11p. The side portions 11k are formed at each end of the back portion 11p. The back portion 11p and the side portions 11k are integrally formed and connected with a fillet (i.e., substantially angled, tapered, or rounded corner) on an interior and exterior corner. The side portions 11k are angled from a trough (i.e., angled with respect to a line extending along the trough) of the U-shape and the side portions 11k substantially have the thickness t1. The back portion 11p substantially has the thickness t1. The thickness t1 of the back portion 11p and the side portions 11k may be a uniform thickness. However, the thickness t1 of the back portion 11p and the side portions 11k may be non-uniform and vary based on mechanical stress requirements. The enlarged portion 11h is formed at each end of the side portions 11k and substantially has the thickness t2.

FIG. 8 is an enlarged view of part D of FIG. 7A. As shown in FIG. 8, the enlarged portion 11h is integrally connected with a fillet at the end of the side portions 11k. The fillet size is set to increase the mechanical strength of the steering apparatus 1. The enlarged portion has a substantially tau-shaped cross-section. However, other cross-sections may be available. An outer surface 11h1 of the enlarged portion 11h has a plurality of surfaces (11m, 11n) which slope from the thickest portion of the enlarged portion away from the side portions 11k and meet at a round portion 11o substantially located at a center of the enlarged portion 11h. Corners of the enlarged portion 11h are rounded (e.g., angled, arc-shaped, elliptical-shaped, etc.).

Functions and Effects of the First Embodiment

The following functions and effects are obtained in the first embodiment.

According to the embodiment of the steering knuckle apparatus 1, a stress occurring on a surface of the end portion 11h formed on the opening-side of the peripheral wall 11g of the section portion 11d can be relaxed by providing the end portion 11h as the enlarged portion, thereby enhancing the strength of the second portion.

Moreover, weight reduction can be achieved when the hollow portion 11j is configured to communicate with the first portion 11c and the second portion 11d, and by providing the opening 11f at the peripheral wall 11g surrounding the second portion 11d.

Even further, rigidity of the arm portion can be improved by integrally (as one piece) connecting the first portion 11c to the connecting portion 11a which is a point of action where a load acts on the arm portion 1a. Rigidity of the arm portion 1a can also be improved by providing the first portion 11c with a closed structure having the peripheral wall 11e enclosing a space around the extending axis L. The above configuration of the arm portion 1a can suppress the deformation of the arm portion 1a when the load acts on the arm portion 1a.

Also, mechanical strength of the steering knuckle apparatus 1 can be enhanced by providing the enlarged portion 11h on both sides of the opening 11f. Mechanical strength of the steering knuckle apparatus 1 can be further enhanced by integrally forming the enlarged portion 11h with the peripheral wall 11e of the first portion 11c. Mechanical strength of the steering knuckle apparatus 1 can be even further enhanced by integrating the enlarged portion 11h with the body part 1e.

According to the above embodiment of the steering knuckle apparatus 1, a torsional stress can be reduced by increasing the width W of the enlarged portion 11h along the extending axis L from the center of the second portion 11d toward the first portion 11c or toward the body part 1e (i.e., W1<W2, W1<W3).

Variations of the Cross-Section of FIG. 7A

FIGS. 7B to 7E are cross-sectional views showing modifications in which shapes of the cross-section of FIG. 7A may be changed so as to provide a modified weight efficient structure and modified cost effective structure that provides the required mechanical strength to carry loads F1 and F2.

In general, in order to further suppress the stress concentration at the end portion, further enhance weight reduction, and/or increase mechanical strength of the steering knuckle apparatus, the cross-sectional surface shape of the enlarged portion 11h may be modified as shown in FIGS. 7B to 7E.

Figure 7B:
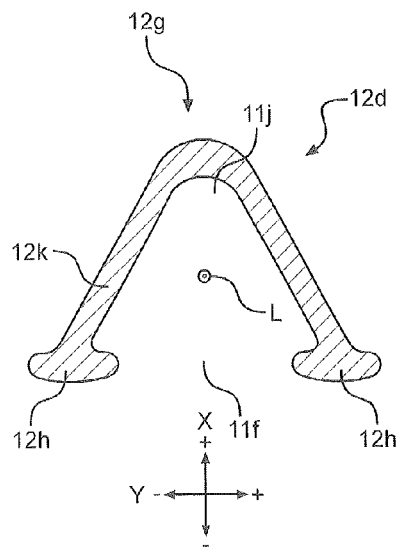

FIG. 7B shows the cross-section of FIG. 3 in a modification in which a shape of the cross-section may be changed. As shown in FIG. 7B, the cross-section has a substantially modified V-shape surrounding the hollow portion 11j which is formed by a peripheral wall 12g of a second portion 12d. The peripheral wall 12g includes a pair of side portions 12k which merge as the apex of the V-shape and enlarged portions 12h. The side portions 12k are integrally formed and connected with a fillet at the apex (i.e., angled, arc-shaped, or rounded corner) on an interior and exterior corner which rounds the apex between the side portions 12k. The side portions 12k are angled from the trough of the V-shape and the side portions 12k substantially have the thickness t1. The enlarged portions 12h are formed at each end of the side portions 12k and substantially has the thickness t2.

The substantially modified V-shape of FIG. 7B may further improve the steering knuckle apparatus 1 and have similar beneficial effects of the exemplary embodiment of FIG. 7A.

Figure 7C:
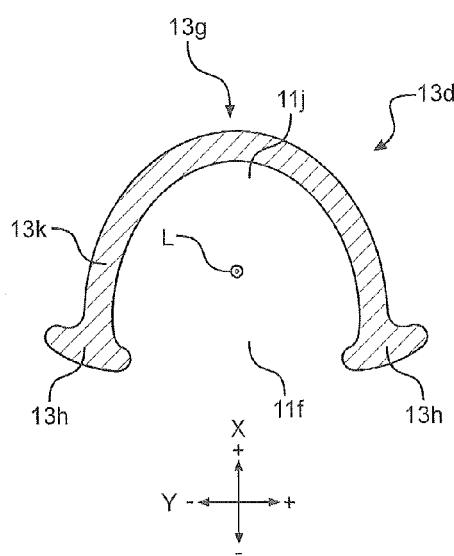

FIG. 7C shows the cross-section of FIG. 3 in a modification in which a shape of the cross-section may be changed. As shown in FIG. 7C, the cross-section has a substantially modified arc-shape (e.g., substantially semi-circular) surrounding the hollow portion 11j which is formed by a peripheral wall 13g of a second portion 13d. The peripheral wall 13g includes a pair of side portions 13k and enlarged portions 13h. The enlarged portions 13h and the side portions 13k are integrally formed. The enlarged portions 13h are formed at each end of the side portions 13k and substantially have the thickness t2. The enlarged portions 13h are angled upwardly and away from the opening 11f. The enlarged portions 13h are positioned such that more of the thickness t2 of the enlarged portions 13h are disposed on a side of an exterior surface of the side portions 13k. The side portions 13k form a continuous curve along the arc-shape between the enlarged portions 13h. The side portions 13k substantially have the thickness t1.

The substantially modified arc-shape of FIG. 7C may further improve the steering knuckle apparatus 1 and have similar beneficial effects of the exemplary embodiment of FIG. 7A.

Figure 7D:
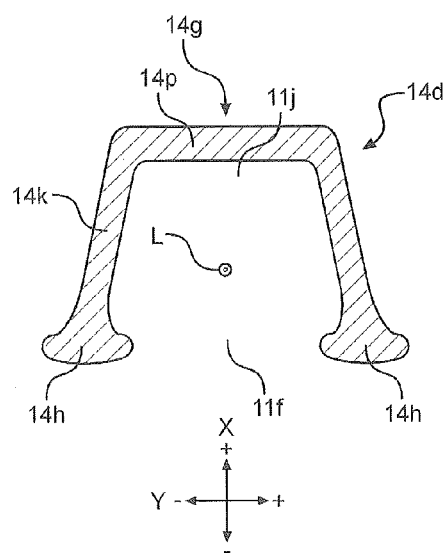

FIG. 7D shows the cross-section of FIG. 3 in a modification in which a shape of the cross-section may be changed. As shown in FIG. 7D, the cross-section has a substantially modified U-shape similar to the U-shape of FIG. 7A. Therefore, only the differences will be discussed. A thickness of the side portions 14k gradually increase from a back portion 14p to the enlarged portions 14h. At a point where the side portions 14k connect to the enlarged portion 14h, a fillet on an exterior surface of the side portions 14k may have a radius greater than a radius of the fillet on an exterior surface of the side portion 11k. The enlarged portions 14h are positioned such that more of the thickness t2 of the enlarged portions 14h are disposed on a side of the exterior surface of the side portions 14k.

The substantially modified arc-shape of FIG. 7D may further improve a stress occurring on a surface of the enlarged portions 14h formed on the opening-side of the peripheral wall 14g of the section portion 14d can be relaxed by a thicker connection point between the enlarged portions 14h and the side portions 14k, thereby enhancing the strength of the second portion.

Further, FIG. 7E shows the cross-section of FIG. 3 in a modification in which a shape of the cross-section may be changed. As shown in FIG. 7E, the cross-section has side portions 15k of a peripheral wall 15g of the second portion 15d. Enlarged portions 11h are formed at a first end of the side portions 15k with the opening 11f being disposed between the side portions 15k at the first end. Enlarged portions 15h are formed at a second end of the side portions 15k with an opening 15f being disposed between the side portions 15k at the second end. The opening 11f and the opening 15f communicate with each other to form a through hole. The side portions 15k are parallel to the height direction of the vehicle body (i.e., X-axis). The enlarged portions 15h protrude on an exterior surface of the side portions 15k and is co-planar on an interior surface of the side portions 15k. The enlarged portions 15h are integrally connected with a fillet at the first end of the side portions 15k.

The substantially modified shape of FIG. 7E may further improve the steering knuckle apparatus 1 and have similar beneficial effects of the exemplary embodiment of FIG. 7A.

FIG. 7F shows the cross-section of FIG. 3 in a modification in which a shape of the cross-section may be changed. As shown in FIG. 7F, the cross-section has a substantially U-shape surrounding the hollow portion 11j which is formed by the peripheral wall 16g of the second portion 16d. The peripheral wall 16g includes a back portion 16p, a pair of side portions 16k adjacent to end portions of the back portion 16p, and enlarged portions 16h. The side portions 16k surround an opening 16f and are parallel to a width direction of the vehicle body (i.e., Y-axis). The back portion 16p is parallel to the height direction of the vehicle body (i.e., X-axis). The back portion 16p and the side portions 16k are integrally formed and connected with a fillet (i.e., rounded corner) on an interior and exterior corner. The back portion 16p and the side portions 16k substantially have the thickness t1. The enlarged portions 16h are formed at each end of the side portions 16k and substantially has the thickness t2.

The U-shape of FIG. 7F may further improve the steering knuckle apparatus 1 and have similar beneficial effects of the exemplary embodiment of FIG. 7A.

According to the modifications above of the steering knuckle apparatus 1, the modification may further enhance the strength of the second portion, reduce weight, improve rigidity, further suppress the deformation of the arm portion 1a when the load acts on the arm portion 1a, enhance mechanical strength, and reduce torsional stress.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A vehicle steering knuckle, comprising:
 a body part to which an axle is attached;
 an arm portion including one end integrally connected with an outer periphery of the body part and spreading outwardly from the body part along an extending axis; and
 a connecting portion integrally connected with another end of the arm portion, the connecting portion being configured to be connected with a vehicle component,
 wherein the arm portion comprises:
  a first portion integrally connected with the connecting portion in a direction along the extending axis;
  a second portion interposed between the first portion and the body part; and
  a hollow portion configured to communicate with the first portion and the second portion,
 wherein the first portion includes a peripheral wall configured to enclose the extending axis, wherein the second portion includes a peripheral wall including an opening partially opened around the extending axis, wherein, at a cross-section intersecting the extending axis, an end portion of the peripheral wall of the second portion on a side of the opening comprises an enlarged portion which is enlarged in thickness as compared with side portions adjacent to the end portion.

2. The vehicle steering knuckle according to claim 1, wherein the enlarged portion is located to intersect a direction of a force acting on the arm portion via the connecting portion.

3. The vehicle steering knuckle according to claim 1, wherein, at the cross-section intersecting the extending axis, the enlarged portion is provided at both sides of the opening.

4. The vehicle steering knuckle according to claim 1, wherein, in the direction along the extending axis, the enlarged portion is extending toward the first portion and integrated with the peripheral wall of the first portion.

5. The vehicle steering knuckle according to claim 4, wherein, in the direction along the extending axis, the enlarged portion is extending toward the body part and integrated with the body part.

6. The vehicle steering knuckle according to claim 5, wherein a width of the enlarged portion is increased from a center of the second portion toward the first portion or the body part along the extending axis.

7. The vehicle steering knuckle according to claim 6, wherein a width measured nearer to the body part of the end portion is between 1.15 and 1.55 times greater than a width at a center of the end portion, or wherein a width measured nearer to the connecting portion of the end portion is between 1.3 and 2.2 times greater than the width at a center of the end portion.

8. The vehicle steering knuckle according to claim 1, wherein an outer surface of the enlarged portion comprises two or more surfaces formed along the extending axis.

9. The vehicle steering knuckle according to claim 1, wherein, at the cross-section intersecting the extending axis, the enlarged portion intersects side portions of the peripheral wall to have a substantially T-shape.

10. The vehicle steering knuckle according to claim 1, wherein the enlarged portion is angled upwardly and away from the opening.

11. The vehicle steering knuckle according to claim 1, wherein the enlarged portion is positioned such that more of the thickness of the enlarged portion is disposed on a side of an exterior surface of the side portions.

12. The vehicle steering knuckle according to claim 1, wherein the enlarged portion is positioned such that an equal amount of the thickness of the enlarged portion is disposed on a side of an exterior surface of the side portions and a side of an interior surface of the side portions.

13. The vehicle steering knuckle according to claim 1, wherein a thickness of the enlarged portion is between 2.75 and 6.75 times greater than a thickness of the side portions.

14. The vehicle steering knuckle according to claim 1, wherein the peripheral wall includes the side portions, a back portion, and the enlarged portion, and wherein the side portions are formed at the end portions of the back portion.

15. The vehicle steering knuckle according to claim 14, wherein the back portion and the side portions are integrally formed and connected with a fillet on an interior and exterior corner.

16. The vehicle steering knuckle according to claim 14, wherein the side portions are disposed to angle away from the extending axis.

17. A steering knuckle for a vehicle including an axle, said steering knuckle comprising:

a body part to which the axle is attached;

an arm portion including one end integrally connected with an outer periphery of the body part and spreading outwardly from the body part along an extending axis; and a connecting portion integrally connected with another end of the arm portion, the connecting portion being configured to be connected with a vehicle component, wherein the arm portion comprises:

a portion interposed between the connecting portion and the body part;

an opening having the extending axis therethrough;

a hollow portion configured to communicate with the opening and the portion, wherein the portion includes a peripheral wall having a first thickness, and wherein, at a cross-section intersecting the extending axis, an end portion of the peripheral wall of the portion on a side of the opening comprises an enlarged portion which has a second thickness, the second thickness being greater than the first thickness.

18. The vehicle steering knuckle according to claim 17, wherein the second thickness is between 2.75 and 6.75 times greater than the first thickness.

* * * * *